United States Patent
Bonen

(10) Patent No.: US 11,005,618 B1
(45) Date of Patent: May 11, 2021

(54) ADAPTIVE HIGH EFFICIENCY, LOW LATENCY DOCSIS PGS SCHEDULER

(71) Applicant: Harmonic, Inc., San Jose, CA (US)

(72) Inventor: Adi Bonen, Belle Mead, NJ (US)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 16/787,718

(22) Filed: Feb. 11, 2020

Related U.S. Application Data

(60) Provisional application No. 62/806,250, filed on Feb. 15, 2019.

(51) Int. Cl.
| | |
|---|---|
| *H04B 3/00* | (2006.01) |
| *H04L 5/00* | (2006.01) |
| *H04L 12/26* | (2006.01) |
| *H04L 12/28* | (2006.01) |

(52) U.S. Cl.
CPC .......... *H04L 5/0044* (2013.01); *H04L 5/0058* (2013.01); *H04L 12/2801* (2013.01); *H04L 43/087* (2013.01); *H04L 43/0882* (2013.01)

(58) Field of Classification Search
CPC . H04L 5/0044; H04L 5/0058; H04L 12/2801; H04L 43/087; H04L 43/0882
USPC .......................... 375/257, 316, 219, 295, 371
See application file for complete search history.

(56) References Cited

U.S. PATENT DOCUMENTS

| | | | |
|---|---|---|---|
| 2016/0197846 A1* | 7/2016 | Bernstein | H04L 47/828 375/222 |
| 2019/0097945 A1* | 3/2019 | Chapman | H04L 47/823 |

* cited by examiner

*Primary Examiner* — Zewdu A Kassa
(74) *Attorney, Agent, or Firm* — Brokaw Patent Law PC; Christopher J. Brokaw

(57) ABSTRACT

Determining when to provide a Proactive Grant Service (PGS) scheduling grant. A plurality of PGS grants are issued to a cable modem (CM). The PGS grants that were utilized by the CM are monitored as well as those PGS grants that were not utilized by the CM. A compromise PGS grants pattern for that CM is generated based on the observations of which PGS grants the CM utilized and which PGS grants the CM did not utilize. The compromise PGS grants pattern for that CM optimizes a projected experienced latency and jitter for particular data flows of the CM verses a projected wasted upstream capacity.

27 Claims, 9 Drawing Sheets

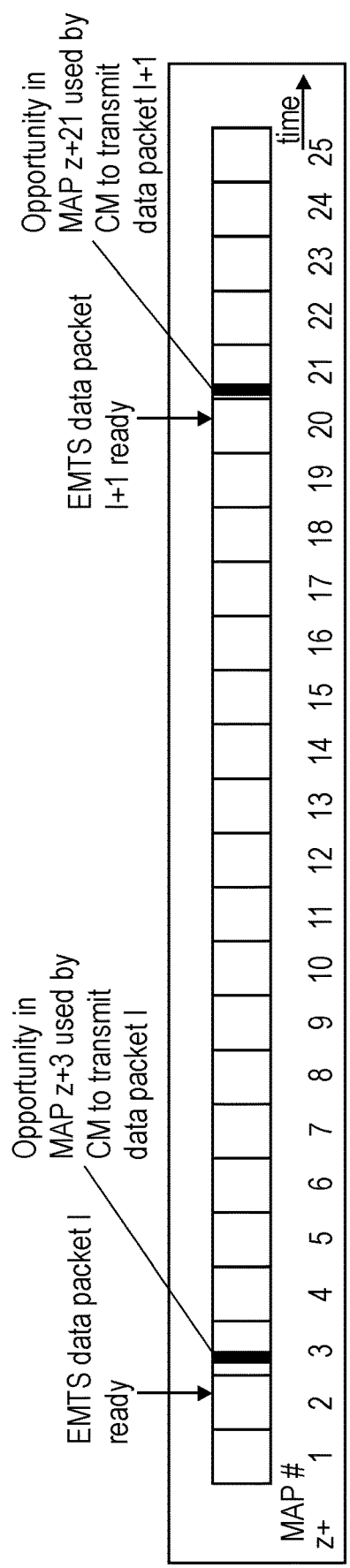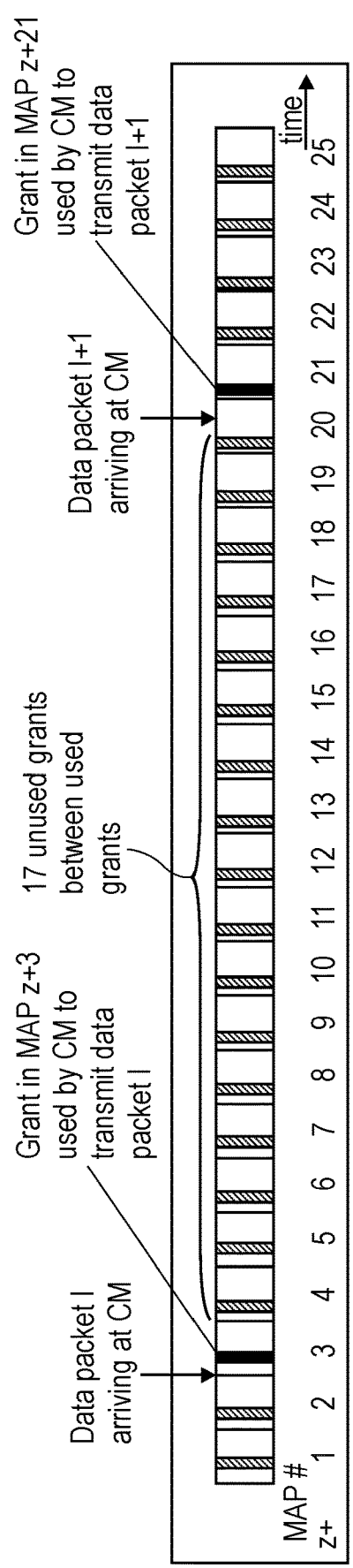
FIG. 2
(PRIOR ART)
FIG. 3
(PRIOR ART)

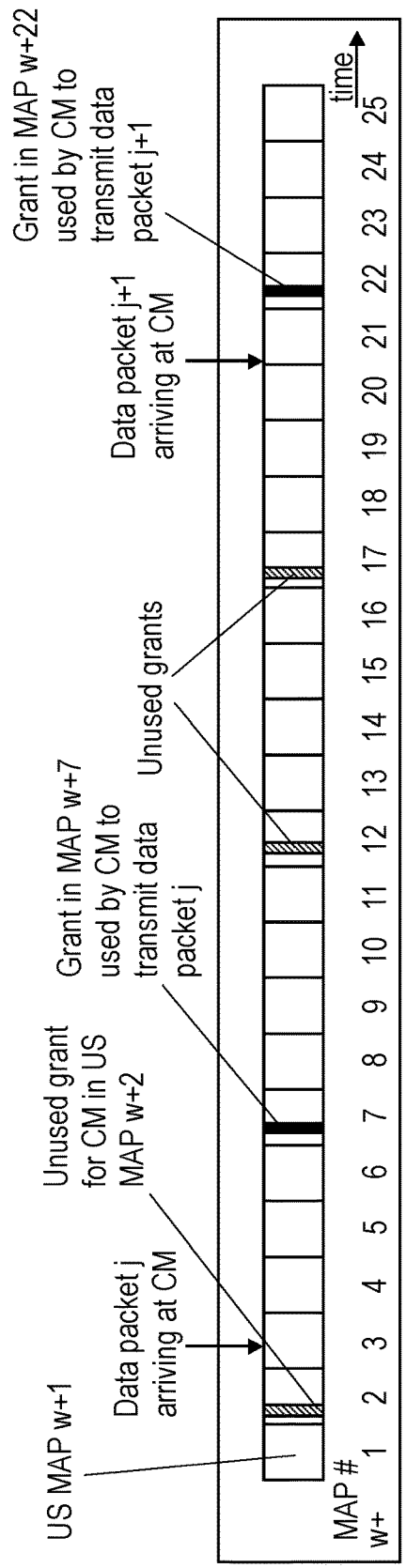
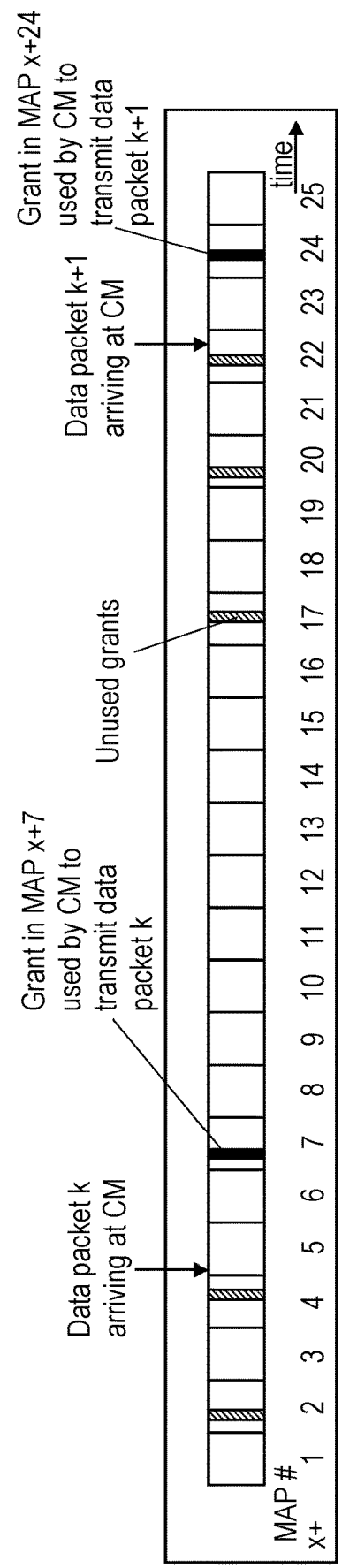
FIG. 7
FIG. 8

ADAPTIVE HIGH EFFICIENCY, LOW LATENCY DOCSIS PGS SCHEDULER

CLAIM OF PRIORITY

The present application claims priority to U.S. Provisional Patent Application No. 62/806,250, entitled "Adaptive High Efficiency Algorithm for Low Latency DOCSIS PGS Scheduler," filed Feb. 15, 2019, the disclosure of which is hereby incorporated by reference for all purposes in its entirety as if fully set forth herein.

FIELD OF THE INVENTION

Embodiments of the invention generally relate to Data Over Cable Service Interface Specification (DOCSIS) Proactive Grant Service (PGS) scheduling.

BACKGROUND

FIG. 1 is an illustration of a point to multipoint communication system used by typical cable television operators in accordance with the prior art. The CableLabs specified Data Over Cable Service Interface Specification (DOCSIS) enables a point to multipoint communication system as shown in FIG. 1 to connect Customer Premises Equipment (CPE), such as computers, to the Internet. A Cable Modem (CM) is typically situated on the customer premise and serves as a gateway device. The CM may connect the cable access network of the cable operator to a plurality of CPE devices (e.g., by means of Ethernet cables, Wi-Fi, and the like) to provide these CPEs with Internet access through the DOCSIS system. A Cable Modem Termination System (CMTS), typically residing in a Multiple Services Operator (MSO) managed location, constitutes the single head point in the point to multipoint communication system, and connects to a plurality of CMs.

Transmission of data packets over a point to multipoint communication system is simpler in the downstream (DS) direction. The DS direction originates at the CMTS, continues to any one of the CMs, and ultimately progresses through the CM to a particular CPE. The reason why the transmission of data packets in simpler in the DS direction is because transmission in that direction does not require a priory coordination between multiple devices as the packets are all being sent from a single location, i.e., the CMTS.

However, upstream (US) data transmissions that originate from a CPE, traverse through a CM, to be received by the CMTS require coordination and scheduling of that transmission by the CMTS. Information about when a packet from a particular CPE is scheduled to be transmitted must be conveyed by the CMTS to the CM in the form of scheduling grants. The use of scheduling grants (or simply 'grants') ensures that transmissions from different CMs do not collide and may be properly received by the CMTS.

The DOCSIS specifications describe several methods for CMs to request opportunities to transmit in the US direction from the CMTS, and further describes a CMTS-generated MAP management message that the CMTS may use to grant transmission opportunities to CMs. The CMTS uses a scheduler to process multiple requests from multiple CMs, as well as internal CMTS requests (such as for maintenance of the CMs or for unsolicited US transmission grants), to construct these MAPs.

Each MAP may specify a plurality of upstream transmission opportunities (or 'grants'). Each MAP may arrange the plurality of grants specified thereby so that each grant is associated with a consecutive US transmission time. Each MAP has an established time in which it becomes active, which corresponds to the time when the first grant specified by the MAP starts. The MAP may span over a total time duration not exceeding a certain time period so that consecutively generated MAPs for a given channel do not overlap in US transmission time. Typically, a CMTS US scheduler uses a fix time period between all MAPs generated for a given channel, e.g., 0.5, 1, or 2 milliseconds. Each MAP is transmitted by the CMTS to all CMs upon generation of each MAP. Although some CMTS US schedulers may employ MAPs which are not equally spaced in time, the continuous stream of MAPs generated and transmitted by the CMTS are typically still arranged consecutively in time.

Note that there can exist periods of time not scheduled by any MAP. By extension, there can exist periods of time without any US transmission grants, especially if the available capacity of the US link over the access system is larger than the instantaneous aggregated demand for US data transmissions from all sources. Some CMTS US schedulers may use grants to dummy CM devices so that no gaps in time exist between MAPs; however, the US channel for which the MAPs are generated by such a CMTS US scheduler will not have actual data carried over it during these dummy grants.

Due to various delays in a DOCSIS system, there are typically several outstanding MAPs in various stages of generation, transmission from the CMTS to all CMs, processing by each CM in the DOCSIS system, MAPs processed by the CM but awaiting for their active time, as well as a MAP actively being employed by CMs. Due to the ordinary DOCSIS delays, typically by the time the CMTS receives transmissions that were granted by a certain MAP, several consecutive MAPs have already been generated by the CMTS US scheduler and transmitted to each CM.

In the course of a normal data flow, a CM receives an US data packet from a CPE. In response, the CM generates a request for an US transmission opportunity using one of the established request methods. The CM forwards this request to the CMTS. This request arrives at the CMTS US scheduler, which correspondingly allocates an appropriate transmit opportunity for that CM in one of the following MAPs. That MAP is then transmitted by the CMTS to all CMs. When the requesting CM receives and processes the MAP with its assigned grants, the CM recognizes the grant it has been specifically given, and thereafter uses the US transmit opportunity to transmit the actual data packet received from the CPE to the CMTS. Thus, while DS data transmissions suffer delays and latency associated with one-way transmission from the CMTS to the CM, US data transmission suffers delays and latency associated with the sum of a) one-way transmission from the CM to the CMTS (for the request of the US transmission opportunity), b) one-way transmission from the CMTS to the CM (for the US transmission grant carried by a MAP), c) one-way transmission from the CM to the CMTS (for the actual US data packet), and d) various MAP generation and CMTS and CM processing delays.

The DOCSIS specification includes support for known data flows requiring low latency (e.g., voice calls from CMs with Embedded Multimedia Terminal Adapter (EMTA)). This support utilizes the DOCSIS specified Unsolicited Grant Service (UGS) mechanism, which provides US transmission opportunities to specific devices and services without a need to request an opportunity for each data packet.

When carrying an active voice call, EMTAs generate periodic data packets to be transmitted US. Upon establishment of an active voice call, the CMTS scheduler periodically allocates a transmit opportunity for that EMTA. The EMTA can set its own voice packetization into data packets such that the data packet is ready just in time for transmission over the periodically provided UGS grant. This saves the EMTA the need to request a transmit opportunity for every data (voice) packet and reduces the US latency endured by this US data packet to the latency caused by a single one-way transmission from the CM to the CMTS.

FIG. 2 is an illustration of an exemplary timing associated with a periodical EMTA US data packet transmission which utilizes periodical dedicated US UGS grant for the data flow in accordance with the prior art. As shown in the example of FIG. 2, the CMTS US scheduler provides a single transmit opportunity for that EMTA every 18 equal length MAPs.

While UGS improves latency for some Multiple Service Operators (MSO)-managed dedicated services and devices, UGS cannot be used for MSO-unknown or MSO-unmanaged services and applications. Although some such services may greatly benefit from lower latency on the access link, and although many of the low latency yearning applications have data flow traits similar to those of Multiple Service Operators (MSO)-managed voice calls (e.g., periodically transmitted data packets), the time-related parameters of these data transmissions are unknown to the operator and/or the CMTS, and consequently appropriate UGS parameters cannot be set for such services.

Online gaming is a vastly popular application which can benefit from low latency data access. Many online games set up a link between a user's computer and a "cloud" server. The cloud server typically invokes a non-latency-sensitive massive-data transfer during a game-stage setup, which provides the computer-run application with general "static" information about the game/stage environment. Once actual play commences, the cloud server periodically transmits DS data packets comprising a "world update" to the user application, informing the application about dynamic changes in the game (such as other players' movements and actions). Similarly, the user's computer game application periodically transmits US data packets comprising a "player update" to the cloud server, informing the cloud server about dynamic game changes invoked by the player (such as movement and actions). Since typical game display apparatus (e.g., TV screens, computer monitors, etc.) typically use a constant refresh rate (e.g., 30 Hz or 60 Hz in North America and 25 Hz or 50 Hz in Europe), most online games detect the user's screen refresh rate and use that rate or one of its derivatives to generate and transmit both the DS "world update" and US "player update" data packets. Thus, often "world update" and "player update" data packets are transmitted at a rate of 25 Hz or 30 Hz.

The actual game status (e.g., position, movement, and actions of all players) resides on the cloud server. Each player receives an update to the game status after a DS latency (i.e., the combined latency from cloud server to his or her CPE), and each player's actions arrive at the game server after an US latency (i.e., the combined latency from a player CPE to the cloud server). The shorter the aggregate sum of the DS latency and the US latency, the better a player in the game is able to react to the game updates, including the actions of other players in the game. Thus, the player game experience is greatly influenced by the latency suffered by periodic update data packets, as well as by the jitter (changes in latency) they suffer. Moreover, a player experiencing a lower combination of DS latency and US latency has a game playing advantage over a player experiencing higher total DS and US latency.

In early 2019, CableLabs released an enhancement to the DOCSIS specifications that included the Low Latency DOCSIS (LLD) suite of capabilities. One of the capabilities of the LLD is the Proactive Grant Service (PGS) US scheduling type, in which an US service flow is proactively given a stream of grants (transmission opportunities) at a rate that generally matches or exceeds the instantaneous demand. A typical user data flow that can make use of the PGS scheduling type is online gaming periodical player updates. The DOCSIS specification enables the CMTS to identify the existence of a low latency data flow, enables setting up PGS scheduling for the data flow, and allows a CM to identify each data packet in the data flow to enable PGS grants to be used with those data packets.

In a typical implementation of PGS scheduling for a low latency data flow, the CMTS US scheduler creates a stream of grants for that data flow. Under DOCSIS own rules, only the particular CM that requested a grant can use an issued grant. Further, under the rules set forth by DOCSIS, a CM may only use US transmission opportunities provided by a grant for the low latency flow for which the grant was requested, as well as for predetermined non-latency-sensitive data if such was identified (e.g., other data arriving to that CM on the same Ethernet connection to the CPE associated with the original grant request). Since the CMTS does not have accurate information on the latency-sensitive data flow, typically the CMTS scheduler provides many more PGS grants than are actually required by that data flow. As a result, since often the CM has no data to send using the grants it has been issued to it, many of the grants issued by the CMTS US scheduler are wasted. Thus, there exists a tradeoff between the number of wasted grants and the latency and jitter experienced by the low latency data flow.

To illustrate this tradeoff, first consider FIG. 3, which is an illustration of exemplary aggressive PGS grant which enables latency of ½ a MAP time on average, a jitter of 1 map time, and wasted capacity of 17/18 of the PGS grants in accordance with the prior art. The actual capacity wasted may be somewhat lower if the CM has other non-latency-sensitive data to transmit in the PGS grants unused for the low-latency data flow, but may also be somewhat higher since the CMTS US scheduler does not know the actual size appropriate for each US data packet, and will typically provide a grant large enough to satisfy the largest anticipated US data packet.

FIG. 4 is an illustration of a less aggressive PGS grant example which enables latency of 1 MAP time on average, a jitter of 2 map times, and wasted capacity of 8/9 of the PGS grants in accordance with the prior art. The actual capacity wasted may be somewhat lower or somewhat higher as explained with reference to FIG. 3. While both latency and jitter suffered by the data flow are double what they were in the previous example of FIG. 3, the wasted capacity in FIG. 4 is about half of the example of FIG. 3.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 2 is an illustration of exemplary timing associated with a periodical EMTA US data packet transmission which utilizes periodical dedicated US UGS grants for the data flow in accordance with the prior art;

FIG. 3 is an illustration of exemplary timing associated with aggressive PGS grants which enables latency of ½ a MAP time on average, a jitter of 1 map time, and wasted capacity of 17/18 of the PGS grants in accordance with the prior art;

FIG. 7 is an illustration of exemplary timing associated with a PGS stream of grants made using a course estimation in accordance with an embodiment of the invention;

FIG. 8 is an illustration of exemplary timing associated with a PGS stream of grants made using refined measurements in accordance with an embodiment of the invention;

DETAILED DESCRIPTION OF THE INVENTION

Figure 1:
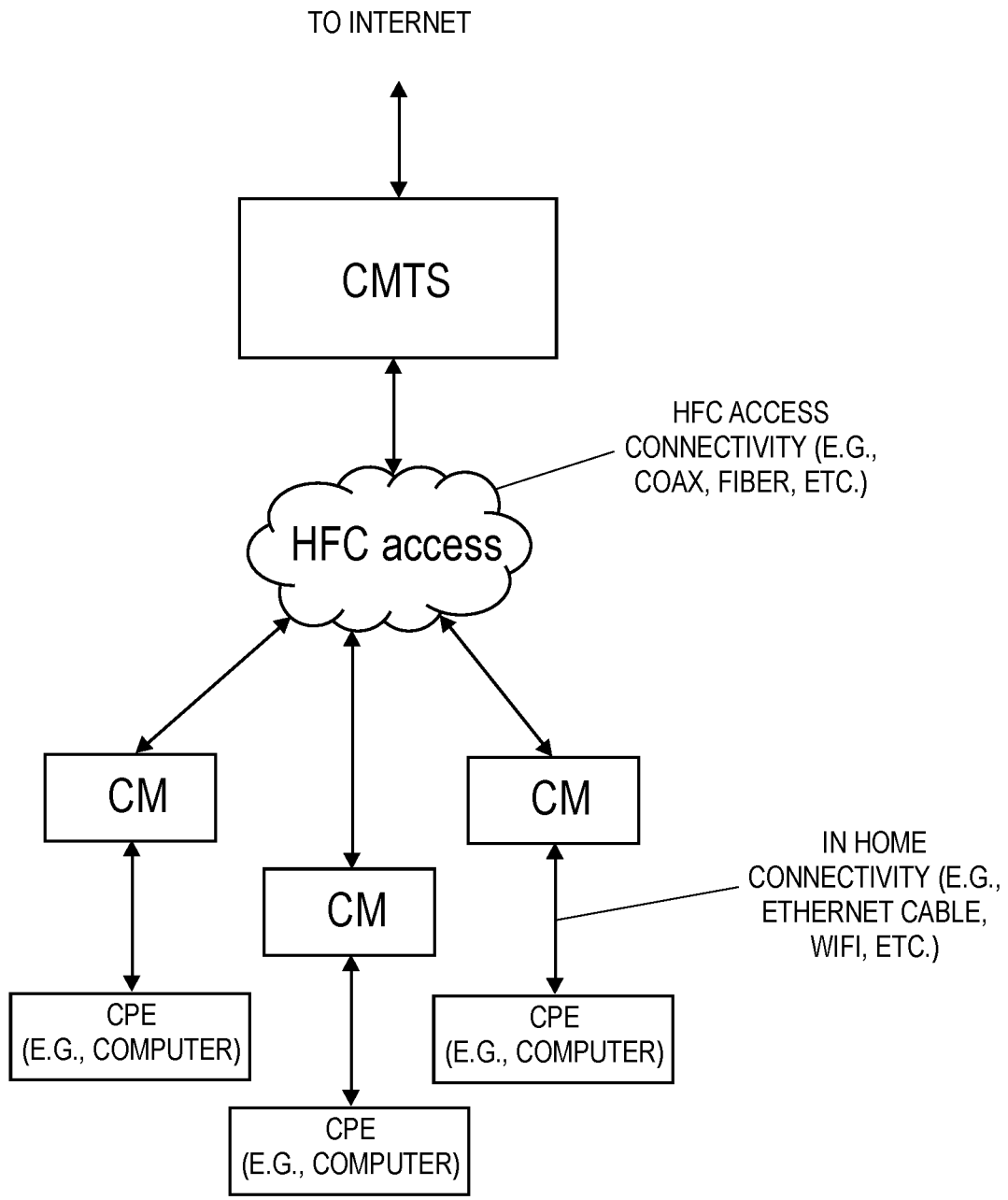
FIG. 1 is an illustration of a point to multipoint communication system used by a typical cable television operator in accordance with the prior art.
Figure 4:
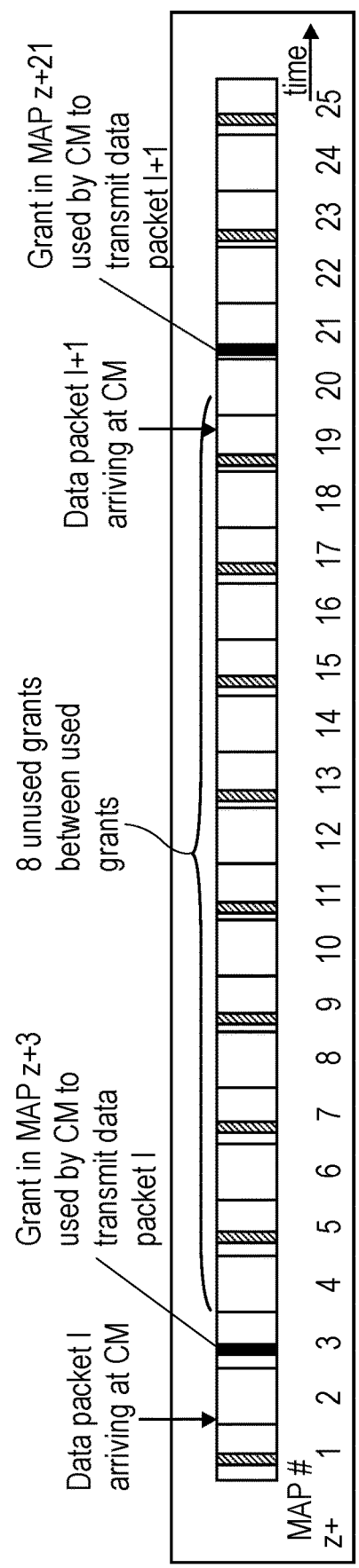
FIG. 4 is an illustration of exemplary timing associated with a less aggressive PGS grants example which enables latency of 1 MAP time on average, a jitter of 2 map times, and wasted capacity of 8/9 of the PGS grants in accordance with the prior art.

Approaches for low latency Data Over Cable Service Interface Specification (DOCSIS) Proactive Grant Service (PGS) scheduling are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

An aim for any Cable Modem Termination System (CMTS) upstream (US) scheduler is to optimize grants to cable modems (CMs) to enable US transmission of the highest possible data capacity. An efficient CMTS US scheduler will minimize unused US channel time as long as data is available to be transmitted on that channel. Hereafter, for simplicity, a constant time period between MAPs is described, and the MAPs are illustrated in the drawings as equal and maximum length; however, embodiments of the invention may be practiced without these restrictions.

Embodiments of the invention advantageously enable the optimization of the exact time points at which PGS opportunities are provided to a cable modem (CM). In an embodiment, this is accomplished by a continuous estimation of when a CM used a past PGS opportunity, relative to those opportunities that the CM did not use. By providing multiple such PGS opportunities and observing which of the opportunities have been utilized by the CM, an estimation of the perfect time for a future PGS opportunity for that CM is determined. Optimizations may be performed on a per CM basis by embodiments.

In most cases, the US capacity in a DOCSIS access system will not be fully utilized. An embodiment of this invention dynamically changes the aggressiveness of PGS scheduling such that less wasted capacity is experienced over the upstream access medium when the total demand for upstream capacity is higher and approaches full utilization of the available capacity. This will be at the expense of higher latency and jitter experienced by the latency sensitive flows addressed by PGS grants. On the other hand, when the total demand for upstream capacity is lower than the total capacity, more aggressive PGS scheduling is used. As a result, lower latency and jitter will be experienced by the latency sensitive flows addressed by PGS grants.

Figure 5:
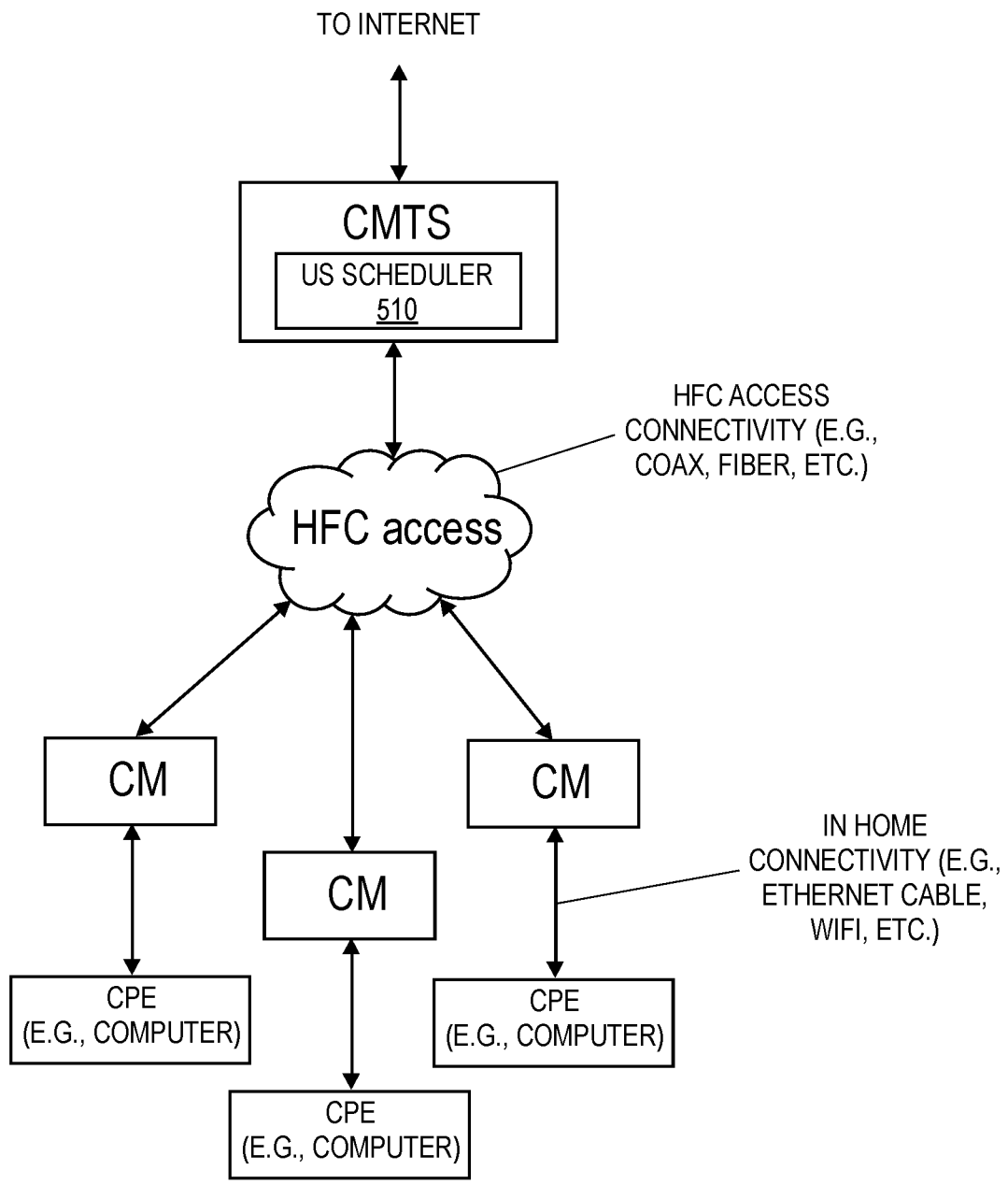
FIG. 5 is an illustration of a point to multipoint communication system that includes an US scheduler usable by a typical cable television operator in accordance with an embodiment of the invention.

FIG. 5 is an illustration of a point to multipoint communication system used by a typical cable television operator in accordance with an embodiment of the invention. Advantageously, the Cable Modem Termination System (CMTS) of FIG. 5 comprises upstream (US) scheduler 510. US scheduler 510 will typically be embodied as software executing upon hardware, although US scheduler 510 may be embodied in specialized hardware. While FIG. 5 depicts US scheduler 510 as comprised within the CMTS, it should be understood to those in the art that the CMTS may be implemented on one physical device or upon multiple physical devices for scalability, redundancy, and performance reasons. Therefore, certain embodiments of the invention may, but need not, implement US scheduler 510 upon a separate physical device than other devices which perform functions attributable to the CMTS.

Figure 6:
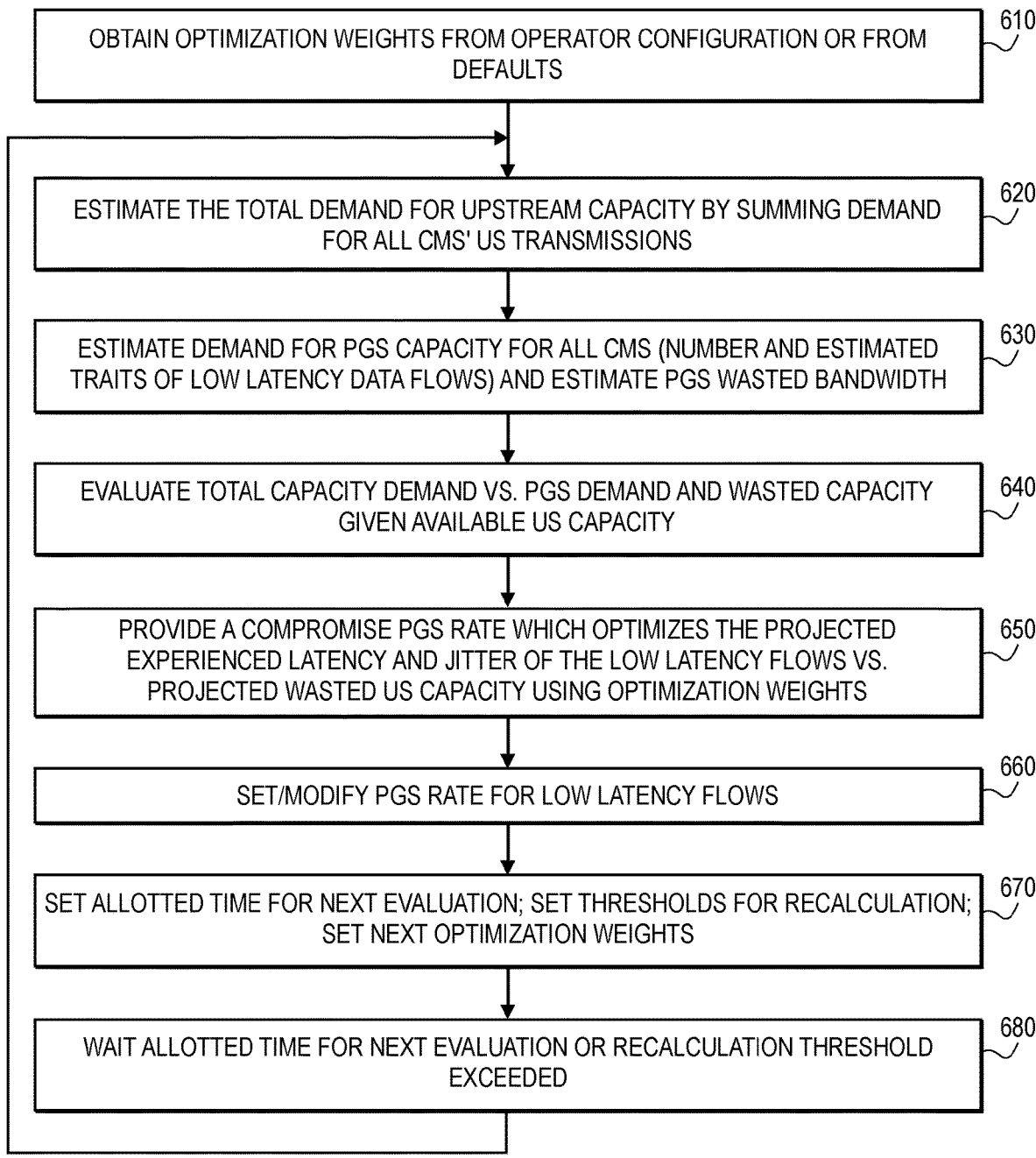
FIG. 6 is a flowchart illustrating the steps performed by a US scheduler in accordance with one embodiment of the invention.

To illustrate the operation of an example embodiment, reference will be made to FIG. 6, which is a flowchart illustrating the steps performed by US scheduler 510 in accordance with one embodiment of the invention. In step 610, one or more optimization weights are obtained by US scheduler 510. Embodiments may employ optimization weights based on a set of default weights, adaptive weights, or weights provided as part of an operator configuration. These optimization weights can be used by embodiments in determining the timing of when to provide a PGS scheduling grant to a particular CM.

In step 620, the total demand for upstream capacity in the point to multipoint communication system is estimated. US scheduler 510 may do so in an embodiment by summing the demand for all US transmissions from all CMs. In step 630, the demand for PGS capacity from all CMs is estimated. The estimate of the demand includes the number of CMs as well as the estimated traits of low latency data flows. In addition, in step 630, the wasted PGS bandwidth by all CMs is estimated.

In step 640, an evaluation is made of the total capacity demand versus the PGS demand and the wasted capacity given the available US capacity. In step 650, US scheduler 510 determines a compromise PGS rate which optimizes the projected experience latency and jitter of the low latency flows versus the projected wasted US capacity using optimization weights.

In step 660, the PGS rate for low latency data flows is set or modified by US scheduler 510. In step 670, the allotted time for the next evaluation to be performed by US scheduler 510 is set. Also, any thresholds for recalculation are set. Further, the next set of optimization weights is set based on observed behavior in the point to multipoint communication system. In step 680, an amount of time is waited or allowed to elapse before processing proceeds back to step 620. This amount of time waited may vary from embodiment to embodiment and may correspond to the predetermined amount of time. Alternatively, when a recalculation threshold is satisfied as determined in step 670, processing proceeds back to step 620 without waiting for the set amount of time to elapse. After step 680, processing proceeds back to step 620. The steps of FIG. 6 may be performed such that a compromise PGS rate may be specifically determined for each CM within the point to multipoint communication system.

In its operation, US scheduler 510 seeks to optimize the issuance of PGS grants to cable modems by adaptive and continuous measurements of low latency data flow traits. An embodiment of this invention measures and monitors the traits of a low latency data flow for purposes of determining when to issue a particular PGS grant so that it is optimized for the expected periodicity, expected time of arrival for each data packet, and expected data packet size of the low latency data flow. US scheduler 510 may initially start such operations using course measurements that provide a course estimate of the periodicity of the low latency data flow and a course expected time of arrival of the low latency data flow's next data packets and maximum data packet size. The PGS stream generated by an embodiment will typically have large grants (significantly larger than the expected maximum packet size of the low latency data flow) in a constant period of one every several MAPs. The wasted capacity due to a large grant size is offset by the relative sparsity of the grants; in this way, the total wasted capacity is kept relatively low. FIG. 7 is an illustration of exemplary timing associated with a PGS stream of grants made using a course estimation in accordance with an embodiment of the invention.

Over time, US scheduler 510 records the specific grants used by the CM for the low latency data flow. US scheduler 510 ignores the transmission of any non-low-latency data packets which use the PGS grants. Once a good estimation of the above the expected periodicity, expected time of arrival for each data packet, and expected data packet size of the low latency data flow is determined, US scheduler 510 estimates the range of time at which a data packet is expected to arrive next. Then, US scheduler 510 increases the rate of the PGS stream (i.e., less MAPs between every two grants) inside this range, but does not allocate grants outside this range.

With reference to the example shown in FIG. 7, after making sufficient measurements, US scheduler 510 estimates the periodicity of the low latency data flow to be between 16 and 20 MAP times, and estimates the expected next data packet time at around MAP x+4±2. Continuing with this example, FIG. 8 is an illustration of exemplary timing associated with a PGS stream that may result from refined measurements observed in accordance with an embodiment of the invention. Two groups of grants are shown allocated for the next two expected data packets in FIG. 8. US scheduler 510 may also reduce the allocated grants size to correspond to a lower expected maximum data packet size based on previous measurements.

US scheduler 510 may continue to refine its estimation of the low-latency data flow periodicity, expected time of arrival of each data packet and expected maximum data packet size. After several such iterations, the predicted accuracy of periodicity and packet arrival time is expected to be accurate enough such that the US scheduler 510 may provide a short sequence of grants (e.g., 3 grants spread over 3 consecutive MAPs). The center grant is the main target for the low latency flow, situated such that the CM can have just enough time to prepare data packet for transmission over the grant. The preceding and following grants serve to fine tune and continuously track the low latency data flow's packet periodicity and arrival time, adapting the estimation to any minor drift and accumulated error in these parameters' estimation. The grant size may also be optimized by US scheduler 510 to be just large enough for the largest expected data flow packet size.

Figure 9:
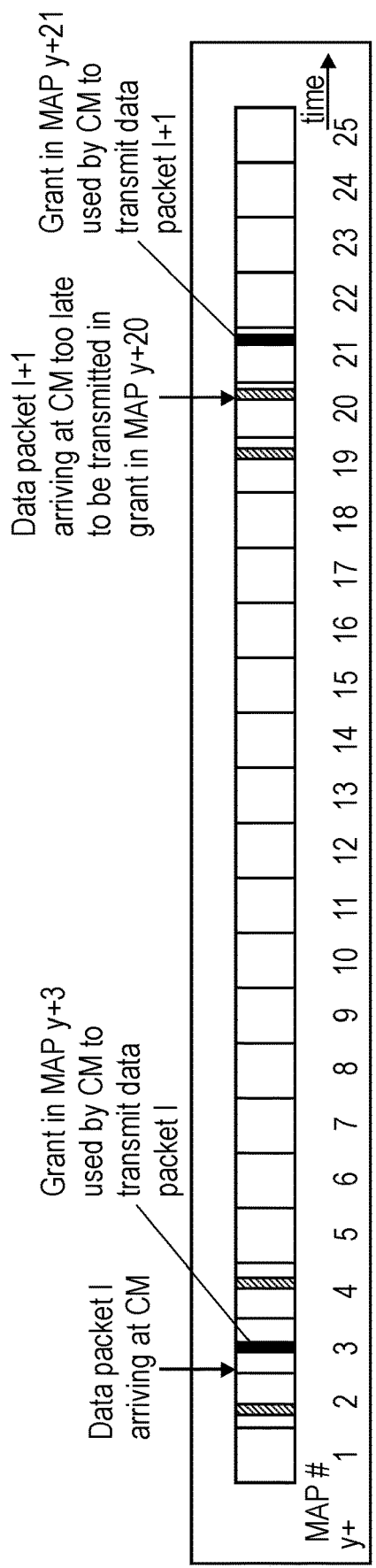
FIG. 9 is an illustration of exemplary timing associated with a longer time period between two consecutive data flow packets in accordance with an embodiment of the invention.

FIG. 9 is an illustration of exemplary timing associated with a longer time period between two consecutive data flow packets in accordance with an embodiment of the invention. As shown in FIG. 9, there is a slightly longer time period between two consecutive data flow packets relative to US scheduler's 510 estimation. This results in the second packet arriving just a little too late to be transmitted in the middle grant in MAP y+20, and is transmitted by the CM in the following third grant in MAP y+21. US scheduler 510 will react to this event by slightly increasing the time distance between groups of grants and by adjusting the expected arrival time of the next packet. Note that the position of each PGS grant inside the MAP does not have to be constant, and US scheduler 510 may adjust the relative position of each grant as part of the optimization.

In another embodiment of this invention, an implementation can go beyond adapting the position of grants in the MAP, and arrange the group of grants such that the time distance between consecutive grants is less than one MAP time. This is especially desirable if US scheduler's 510 estimated low-latency data flow measurement accuracy is better than one MAP time.

Figure 10:
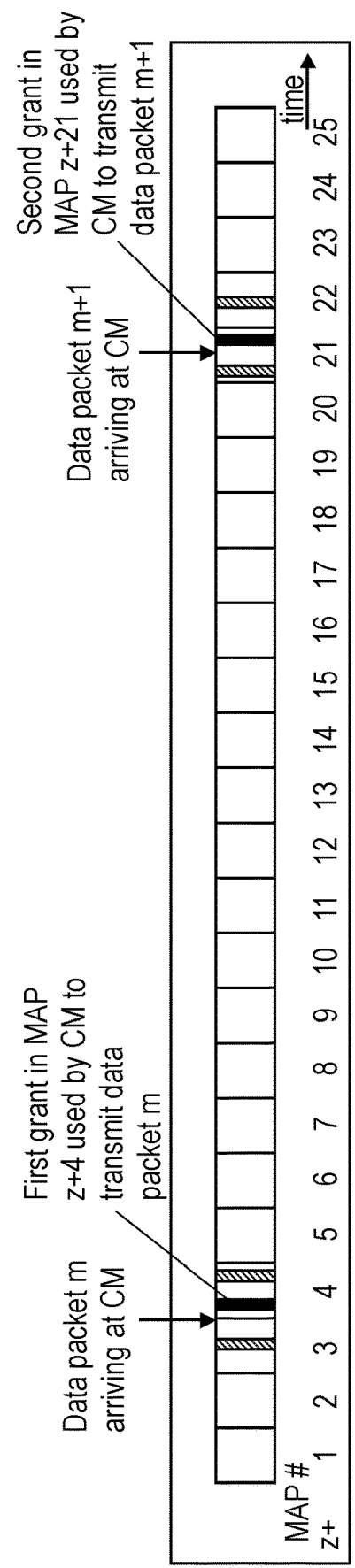
FIG. 10 is an illustration of exemplary timing associated with multiple PGS grants per MAP in accordance with an embodiment of the invention.

FIG. 10 is an illustration of exemplary timing associated with multiple PGS grants per MAP in accordance with an embodiment of the invention. As shown in FIG. 10, US scheduler 510 may construct a MAP that comprises more than one grant per MAP (e.g., ½ a MAP time apart). As a consequence, the average latency is reduced to about ¼ MAP time and jitter to ½ MAP time. Note that there is no wasted capacity penalty to the 2× improvement in latency and jitter performance enabled by providing 2 grants per MAP. In fact, the basic wasted capacity by US scheduler 510 using groups of 3 grants is expected to be 2/3 of the PGS rate, regardless of the ultimately converged latency and jitter achieved.

In another embodiment of the invention, US scheduler 510 may use a similar group of PGS grants scheme during the acquisition and fine estimation stages of a low-latency data flow timing as described above. Thereafter, in a steady state occurring after initial acquisition and fine data flow parameters estimation, US scheduler 510 may use a single grant per low latency data flow data packet, where the time of the PGS-allocated single grant is set to be a fix-time-duration after the ideal expected arrival time of each of low latency data flow packet (e.g., one MAP time duration). Thus, the average latency suffered by the low latency data flow in such an embodiment is the fix-time-duration.

To enable continuous tracking of each packet expected arrival time, US scheduler 510 may occasionally place an additional grant to detect a possible timing drift while keeping the regular grant at the fix-time-duration after the ideal expected arrival time of each of the low latency data flow packets. The occasional additional grant may be placed slightly before the expected packet arrival time to detect an accumulated negative time drift that slowly moves the actual packet arrival time a little earlier than expected. If such negative time drift is present, the arrival time of the low latency data flow packet will occur before the occasional additional grant, and the CM will use the additional grant to transmit the low latency data flow packet instead of the regularly placed grant. US scheduler 510 can thus quantify the negative time drift and adjust the next packet expected arrival time and estimated low latency data flow period.

Figure 11:
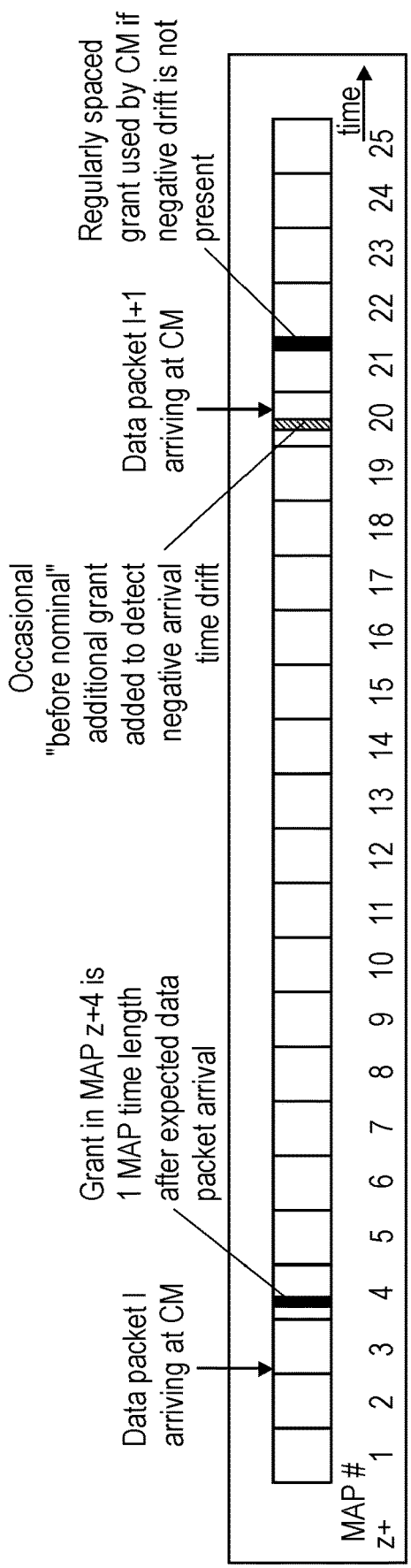
FIG. 11 is an illustration of exemplary timing associated with an occasional second early grant that was provided to the CM but not used to transmit the packet in accordance with an embodiment of the invention.

FIG. 11 is an illustration of exemplary timing associated with an occasional additional "before nominal" grant was provided to the CM but not used to transmit the packet in accordance with an embodiment of the invention. With reference to FIG. 11, as the CM did not use the opportunity of the additional "before nominal" grant to transit a packet, this indicates that no negative time drift exists (or is too small to be measured). When such occurs, US scheduler 510 does not need to adjust the next packet expected arrival time or the estimated data flow period.

Similarly, the occasional additional grant can be placed slightly after the expected packet arrival time, but still before the regular grant, to detect an accumulated positive time drift that slowly moves the actual packet arrival time a little later than expected. If such positive time drift is present, the arrival time of data flow packet will occur after the occasional additional grant, and the CM will use the regularly placed grant to transmit the data packet. US scheduler 510 can thus quantify the positive time drift and adjust the next packet expected arrival time and estimated data flow period.

Figure 12:
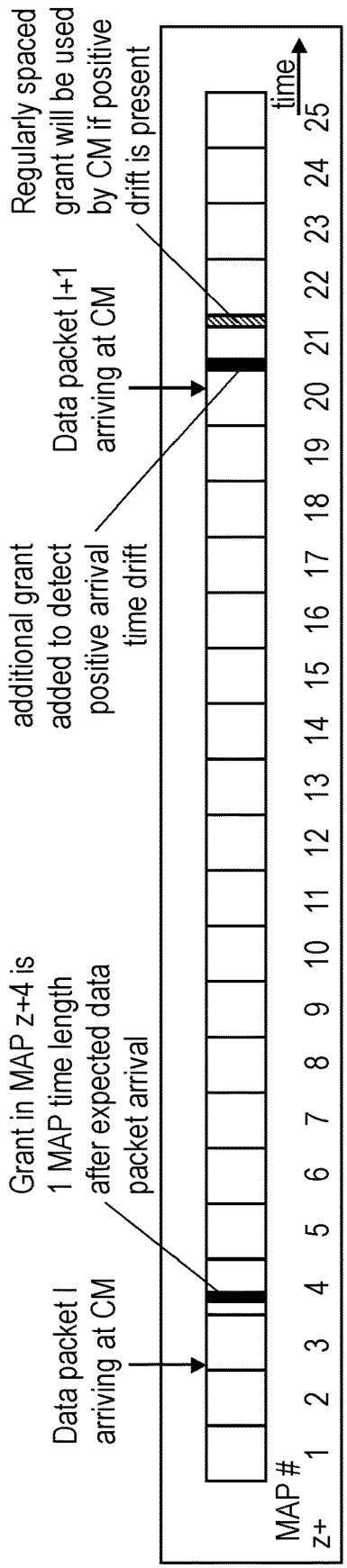
FIG. 12 is an illustration of exemplary timing associated with an occasional second late grant that was provided by the US scheduler and used by a cable modem to transmit the packet in accordance with an embodiment of the invention.

FIG. 12 is an illustration of exemplary timing associated with an occasional additional "after nominal" grant was provided by US scheduler 510 and used by the CM to transmit the packet in accordance with an embodiment of the invention. When the CM transmits the packet using the additional "after nominal" grant, this indicates that no positive time drift exists (or is too small to be measured). When such occurs, US scheduler 510 does not need to adjust the next packet expected arrival time or the estimated data flow period.

The normal use of just a single PGS grant per low-latency data flow packet advantageously results in an efficient process by wasting only the capacity associated with the occasionally used second grants. Thus, the basic wasted capacity is close to zero, and waste is only due to the grants being large enough to accommodate the largest expected low latency data flow maximum packet size rather than the actual size of each packet. The frequency of the occasionally used second grant can be adjusted by US scheduler 510 to correspond to the history of the actual drift experienced in the system and to the estimated jitter that exists in the CPE and in between the CPE and the CM (i.e., the Ethernet link jitter). That jitter will be manifested in back and forth changes to periodicity as measured by US scheduler 510.

Figure 13:
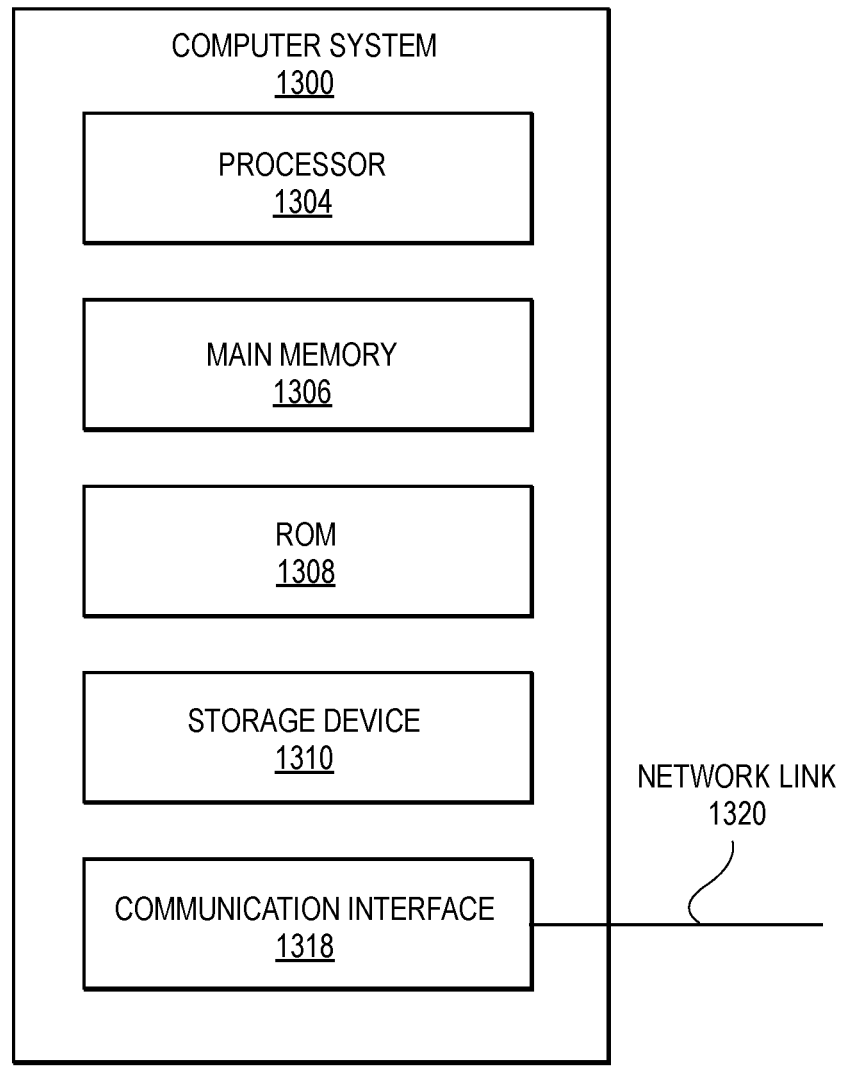
FIG. 13 is a block diagram that illustrates a computer system upon which software performing one or more of the steps or functions discussed above may be implemented.

FIG. 13 is a block diagram that illustrates a computer system 1300 upon which software performing one or more of the steps or functions discussed above may be implemented. In an embodiment, computer system 1300 includes processor 1304, main memory 1306, ROM 1308, storage device 1310, and communication interface 1318. Computer system 1300 includes at least one processor 1304 for processing information. Computer system 1300 also includes a main memory 1306, such as a random access memory (RAM) or other dynamic storage device, for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device for storing static information and instructions for processor 1304. A storage device 1310, such as a magnetic disk or optical disk, is provided for storing information and instructions.

Embodiments of the invention are related to the use of computer system 1300 for implementing the techniques described herein, e.g., US scheduler 510 may be embodied on a general-purpose or special-purpose computer system. According to one embodiment of the invention, US scheduler 510 may perform any of the actions described herein by computer system 1300 in response to processor 1304 executing one or more sequences of one or more instructions contained in main memory 1306. Such instructions may be read into main memory 1306 from another machine-readable medium, such as storage device 1310. Execution of the sequences of instructions contained in main memory 1306 causes processor 1304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any non-transitory tangible medium that participates in storing instructions which may be provided to processor 1304 for execution. Note that transitory signals are not included within the scope of a non-transitory machine-readable storage medium. A non-transitory machine-readable storage medium may take many forms, including but not limited to, non-volatile media and volatile media. Non-volatile media includes, for example, optical or magnetic disks, such as storage device 1310. Volatile media includes dynamic memory, such as main memory 1306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a network link 1320 to computer system 1300.

Communication interface 1318 provides a two-way data communication coupling to a network link 1320 that is connected to a local network. For example, communication interface 1318 may be an integrated services digital network (ISDN) card or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through a local network to a host computer or to data equipment operated by an Internet Service Provider (ISP).

Computer system 1300 can send messages and receive data, including program code, through the network(s), network link 1320 and communication interface 1318. For example, a server might transmit a requested code for an application program through the Internet, a local ISP, a local network, subsequently to communication interface 1318. The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences for determining when to provide a Proactive Grant Service (PGS) scheduling grant, which when executed by one or more processors, cause:
    monitoring which PGS grants, of a plurality of PGS grants issued to a cable modem (CM), were utilized by the CM and which PGS grants were not utilized by the CM; and
    generating, based on observations of when PGS grants in the plurality of PGS grants were utilized by said CM and when PGS grants in the plurality of PGS grants were not utilized by said CM, a compromise PGS grants pattern of one or more regular intervals of time at which to issue a PGS scheduling grant for that CM to optimize a projected experienced latency and jitter for particular data flows verses a projected wasted upstream capacity, wherein each of said one or more regular intervals of time is located at a specified point in time within said compromise PGS grants pattern.

2. The non-transitory computer-readable storage medium of claim 1, wherein generating the compromise PGS grants pattern results in less wasted US capacity as the total demand for the available DOCSIS US capacity approaches full utilization.

3. The non-transitory computer-readable storage medium of claim 1, wherein generating the compromise PGS grants pattern results in lower latency and jitter for said CM's particular data flows while the total demand for the available DOCSIS US capacity is less than a determined amount.

4. The non-transitory computer-readable storage medium of claim 1, wherein generating the compromise PGS rate is performed using a set of optimization weights.

5. The non-transitory computer-readable storage medium of claim 1, wherein execution of the one or more sequences of instructions further causes:
    repeating the generation of said compromise PGS grants pattern at periodic intervals or upon determining a change in a condition has occurred.

6. The non-transitory computer-readable storage medium of claim 1, wherein said generating the compromise PGS grants pattern comprises:
    refining the compromise PGS grants pattern for the CM over time using measurements obtained at different points in time.

7. The non-transitory computer-readable storage medium of claim 1, wherein said generating the compromise PGS grants pattern comprises:
    arranging a group of grants such that a time interval between consecutive grants is less than one bandwidth allocation MAP time.

8. The non-transitory computer-readable storage medium of claim 1, wherein said generating the compromise PGS grants pattern comprises:
    performing a first set of grants at a fixed time interval for a particular flow; and
    performing an occasional additional grant at a variable time interval for the particular flow to detect a possible timing drift in the particular flow.

9. The non-transitory computer-readable storage medium of claim 1, wherein the compromise PGS grants pattern is optimized for one or more of: expected periodicity, expected time of arrival for each data packet, and expected data packet size of the particular data flows of the CM.

10. An apparatus for determining when to provide a Proactive Grant Service (PGS) scheduling grant, comprising:
    one or more processors; and
    one or more non-transitory computer-readable storage mediums storing one or more sequences of instructions, which when executed, cause:
        monitoring which PGS grants, of a plurality of PGS grants issued to a cable modem (CM), were utilized by the CM and which PGS grants were not utilized by the CM; and
        generating, based on observations of when PGS grants in the plurality of PGS grants were utilized by said CM and when PGS grants in the plurality of PGS grants were not utilized by said CM, a compromise PGS grants pattern of one or more regular intervals in time at which to issue a PGS scheduling grant for that CM to optimize a projected experienced latency and jitter for particular data flows verses a projected wasted upstream capacity, wherein each of said one or more regular intervals of time is located at a specified point in time within said compromise PGS grants pattern.

11. The apparatus of claim 10, wherein generating the compromise PGS grants pattern results in less wasted US capacity as the total demand for the available DOCSIS US capacity approaches full utilization.

12. The apparatus of claim 10, wherein generating the compromise PGS grants pattern results in lower latency and jitter for said CM's particular data flows while the total demand for the available DOCSIS US capacity is less than a determined amount.

13. The apparatus of claim 10, wherein generating the compromise PGS rate is performed using a set of optimization weights.

14. The apparatus of claim 10, wherein execution of the one or more sequences of instructions further causes:
   repeating the generation of said compromise PGS grants pattern at periodic intervals or upon determining a change in a condition has occurred.

15. The apparatus of claim 10, wherein said generating the compromise PGS grants pattern comprises:
   refining the compromise PGS grants pattern for the CM over time using measurements obtained at different points in time.

16. The apparatus of claim 10, wherein said generating the compromise PGS grants pattern comprises:
   arranging a group of grants such that a time interval between consecutive grants is less than one bandwidth allocation MAP time.

17. The apparatus of claim 10, wherein said generating the compromise PGS grants pattern comprises:
   performing a first set of grants at a fixed time interval for a particular flow; and
   performing an occasional additional grant at a variable time interval for the particular flow to detect a possible timing drift in the particular flow.

18. The apparatus of claim 10, wherein the compromise PGS grants pattern is optimized for one or more of: expected periodicity, expected time of arrival for each data packet, and expected data packet size of the particular data flows of the CM.

19. A method for determining when to provide a Proactive Grant Service (PGS) scheduling grant, comprising:
   monitoring which PGS grants, of a plurality of PGS grants issued to a cable modem (CM), were utilized by the CM and which PGS grants were not utilized by the CM; and
   generating, based on observations of when PGS grants in the plurality of PGS grants were utilized by said CM and when PGS grants in the plurality of PGS grants were not utilized by said CM, a compromise PGS grants pattern of one or more regular intervals in time at which to issue a PGS scheduling grant for that CM to optimize a projected experienced latency and jitter for particular data flows verses a projected wasted upstream capacity, wherein each of said one or more regular intervals of time is located at a specified point in time within said compromise PGS grants pattern.

20. The method of claim 19, wherein generating the compromise PGS grants pattern results in less wasted US capacity as the total demand for the available DOCSIS US capacity approaches full utilization.

21. The method of claim 19, wherein generating the compromise PGS grants pattern results in lower latency and jitter for said CM's particular data flows while the total demand for the available DOCSIS US capacity is less than a determined amount.

22. The method of claim 19, wherein generating the compromise PGS rate is performed using a set of optimization weights.

23. The method of claim 19, further comprising:
   repeating the generation of said compromise PGS grants pattern at periodic intervals or upon determining a change in a condition has occurred.

24. The method of claim 19, wherein said generating the compromise PGS grants pattern comprises:
   refining the compromise PGS grants pattern for the CM over time using measurements obtained at different points in time.

25. The method of claim 19, wherein said generating the compromise PGS grants pattern comprises:
   arranging a group of grants such that a time interval between consecutive grants is less than one bandwidth allocation MAP time.

26. The method of claim 19, wherein said generating the compromise PGS grants pattern comprises:
   performing a first set of grants at a fixed time interval for a particular flow; and
   performing an occasional additional grant at a variable time interval for the particular flow to detect a possible timing drift in the particular flow.

27. The method of claim 19, wherein the compromise PGS grants pattern is optimized for one or more of: expected periodicity, expected time of arrival for each data packet, and expected data packet size of the particular data flows of the CM.

* * * * *